United States Patent [19]

Balducci

[11] Patent Number: 4,893,748
[45] Date of Patent: Jan. 16, 1990

[54] HEATING METHOD AND DEVICE FOR VEHICLES REQUIRING LIMITED POWER

[75] Inventor: David Balducci, Toulouse, France

[73] Assignee: ABG SEMCA, Paris, France

[21] Appl. No.: 154,494

[22] Filed: Feb. 8, 1988

Related U.S. Application Data

[63] Continuation of Ser. No. 843,223, Mar. 24, 1986, abandoned.

[30] Foreign Application Priority Data

Mar. 26, 1985 [FR] France ................................ 85 03392

[51] Int. Cl.⁴ ............................................. G05D 23/00
[52] U.S. Cl. .................................... 237/2 A; 237/2 B; 237/12.3 R; 62/196.4; 165/42
[58] Field of Search ................... 62/239, 196.4, 324.1; 165/42, 43, 61, 4; 237/2 B, 2 A, 12.3 R

[56] References Cited

U.S. PATENT DOCUMENTS

| | | | |
|---|---|---|---|
| 4,246,759 | 1/1981 | Signoret | 62/196.4 |
| 4,353,221 | 10/1982 | Taylor | 62/239 |
| 4,399,665 | 8/1983 | Evans et al. | 62/239 |

*Primary Examiner*—Henry A. Bennet
*Attorney, Agent, or Firm*—Oblon, Spivak, McClelland, Maier & Neustadt

[57] ABSTRACT

A heating method and device for vehicles with limited power requirement, more particularly for light vehicles such as helicopters and light aircraft. For limiting the weight of the auxiliary airborne equipment, the invention provides at least partially heating of the cabin by reversal of the cooling cycle. For that a valve diverts coolant fluid to the evaporator for reheating the recirculation air of the cabin.

10 Claims, 2 Drawing Sheets

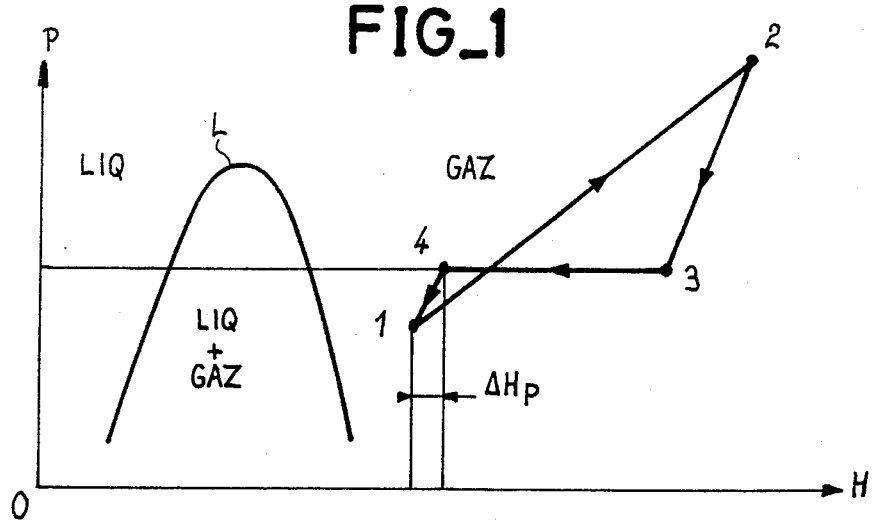
FIG_1
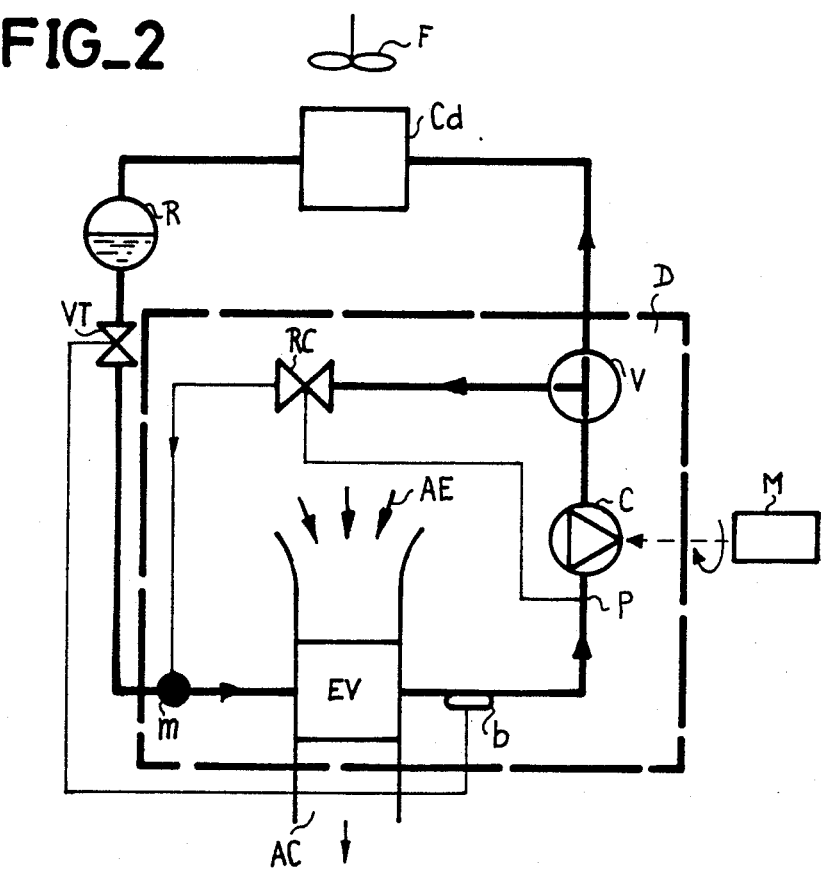
FIG_2

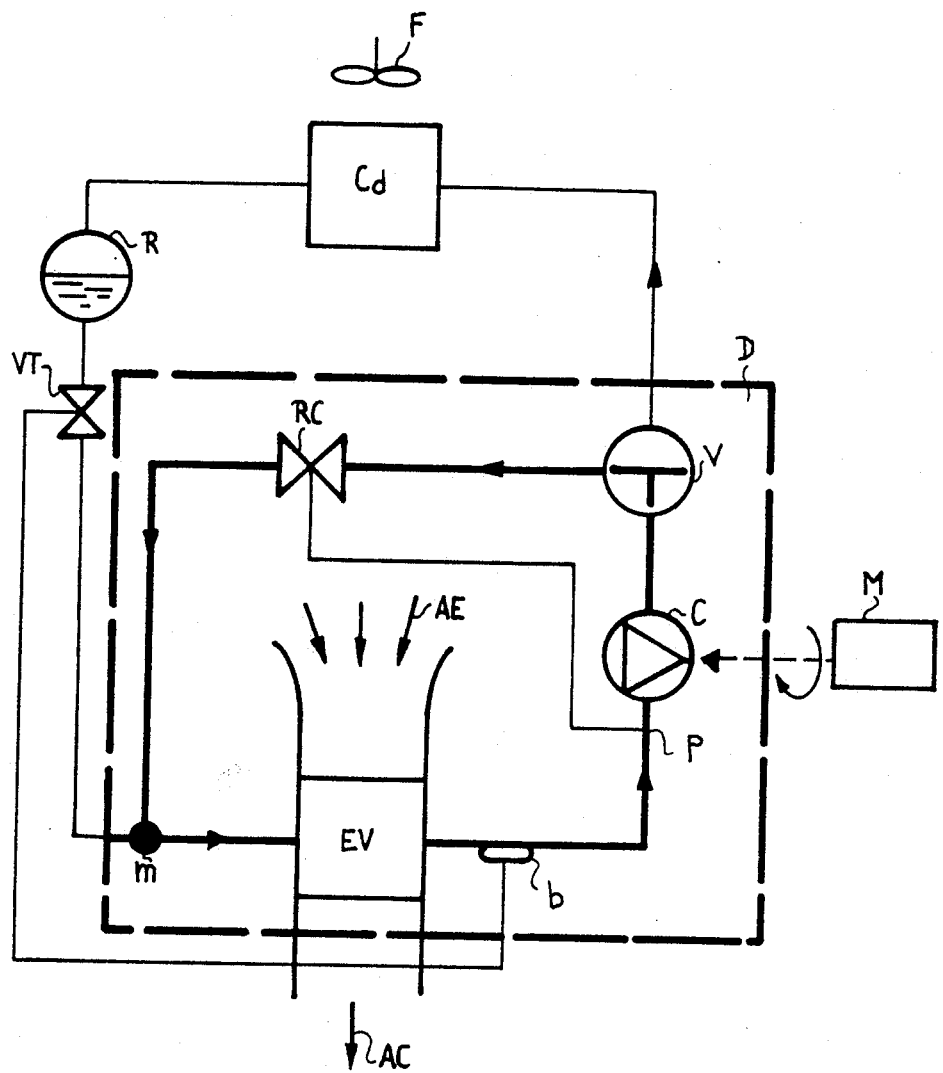
FIG_3

HEATING METHOD AND DEVICE FOR VEHICLES REQUIRING LIMITED POWER

This application is a continuation of application Ser. No. 843,223, filed on Mar. 24, 1986, now abandoned.

BACKGROUND OF THE INVENTION

The present invention relates to a heating method. It also relates to a heating device for vehicles requiring limited power. It finds an application in the aeronautical field and more particularly for heating helicopter and light aircraft cabins.

In such light vehicles, the power which may be consumed for heating the pilot's cockpit and the passenger cabin is relatively limited. For such application to a helicopter, in one embodiment, this power is limited to about 5 kilowatts. A method used at the present time consists in taking the hot gases from the engines which are mixed with an air flow coming from outside. But helicopters and other light aircraft generally comprise an air conditioning unit. Such air conditioning maintains the temperature of the cabin below a certain threshold depending on the thermal balance of the cabin. Since the equipment carried on board the aircraft must be limited to a minimum weight, such a heating solution has the drawback of appreciably increasing the weight of an onboard air conditioning installation. The present invention overcomes this disadvantage of the prior art.

SUMMARY OF THE INVENTION

In fact, it provides a heating method which locally modifies the operation of an air borne air conditioner, the air conditioner comprising at least one compressor and an evaporator.

The method of the invention consists, after compression of a coolant fluid, in causing expansion of this fluid and heating of the air flow during an isobar exchange in the evaporator through which this air flow passes before entering the cabin.

It also relates to a heating device for vehicles with limited power requirement, of the type which comprises air conditioning by air flow over a coolant fluid circuit; Such a circuit comprises a compressor whose delivery side is connected to a condenser then to a buffer reservoir and finally a thermostatic valve and an evaporator. The external air flow passes through the evaporator to which it gives up its heat and is injected into the cabin. The invention is characterized more especially by the fact that the heating device comprises in the air conditioning circuit a means for diverting the delivery of the compressor to a depression generating device in a mixer for heating the cold air flow through the evaporator in order to provide heating for the cabin.

BRIEF DESCRIPTION OF THE DRAWINGS

Other features and advantages will be clear from the following description and the drawings which show:

FIG. 1 a pressure enthalpy diagram explaining the heating method of the invention; and FIG. 2 and FIG. 3 diagrams of one embodiment of a device in the air conditioning mode then in the heating mode, in accordance with the invention.

DESCRIPTION OF THE PREFERRED EMBODIMENTS

In FIGS. 2 and 3 a heating device D in accordance with the invention has been shown.

Such a device is formed from the freon loop air conditioning device. In such a device, a drive shaft M delivers mechanical power to a compressor C. Since the power delivered by the air frame designer for subsidiary installations is limited, the air conditioning elements must be dimensioned as well as possible in view of the desired characteristics. At the outlet of the compressor, the fluid passes through the exchanger and is condensed. For that the condenser is equipped with a fan F. The forced external air flow causes cooling of the fluid. The outlet of the condenser is connected to a reservoir R which makes available a freon reserve then to a thermostatic valve which regulates the flow rate of the coolant fluid in the evaporator. Finally, the liquid-gas mixture is heated in an evaporator EV. The evaporator receives the air flow AE for recirculation from the cabin. This air AE comes for example from recycling the air of the cabin. The air which has given up its heat to the evaporator is then reinjected into the cabin. In the freon circuit, the outlet of evaporator EV is connected to the suction side of a compressor C. Such an air conditioning loop is well known and widely used in airborne systems;

The invention resides in the fact of reversing the operation of the evaporator when hot air is to be blown into the cabin. The use of the air conditioning circuit considerably reduces the proportion of the weight of the heating system in the total weight of the auxiliary airborne equipment. For this, in accordance with the invention, the freon is kept in gaseous form at a relatively high temperature so that the recirculation air AE is heated in contact therewith. A feature of the invention consists in disposing a branch means such as a three way valve V at the delivery side of compressor C. Such a valve V comprises a freon input and two outputs which may be chosen alternately. Control of the chosen path may be made manually by the operator or automatically by means of a temperature sensor.

In FIG. 2, the valve V is shown schematically in the air conditioning position. For this, the delivery from the compressor is fed to the condenser CD.

In FIG. 2 a variant of construction has been shown in which a part of the delivered gas flow is fed to a capacity regulator RC which increases the adjustment capacity of the air conditioning device. To this end, a gaseous part of the freon is injected by a mixer m into the gas/liquid stream supplied by the thermostatic valve VT. The capacity regulator is controlled for example by a pressure sensor disposed at the suction input P of the compressor.

In accordance with the invention, the freon is diverted from the delivery side of the compressor to a depression generating device. This device RC provides an isenthalpic expansion which causes expansion of the freon in the gaseous phase without loss of energy and allows transfer into the evaporator which then works in reverse operation. In fact, instead of absorbing the heat from the external air or from the recirculated air from the cabin, it gives up heat to the gaseous freon so as to heat the cabin with hot air AC.

In one embodiment, the depression generating means may be formed by the capacity regulator of the air conditioning device itself.

In another embodiment, diverting the delivery from the compressor to the evaporator may be achieved by stopping the motor of the fan F which equips the condenser CD.

In another embodiment, several depression generating devices are placed in parallel and may be selected depending on the degree of heating required. This may be made necessary when the main depression generating means is formed by the capacity regulator RC which normally equips the air conditioner. Then one or more additional depression generating means formed by nozzles are placed in parallel with the capacity regulator RC. In another embodiment, a depression generating means is used comprising a nozzle with controllable passage section. The different controls for the means, which have been described may be provided either by thermodynamic parameters such as taking the pressure in the ducts or else by electronic means using sensors adapted so as to obtain the desired degree of heating. Such heating may be expressed by any measurable parameter such as the ambient temperature or non measurable parameter such as the comfort of the occupants.

Since the method of the invention does not allow the compressor to be used at full power because of the problem of sucking the liquid freon, in order to provide the required heating a heating resistance or any other means for heating or preheating the air stream to be heated in accordance with the invention is also provided at the air inlet of the evaporator EV. In another embodiment, the buffer reservoir and the evaporator are preheated.

In FIG. 1, an operating cycle of the method of the invention has been shown. At point 1, situated at the inlet of the compressor for increasing the pressure, the temperature and the enthalpy of a coolant fluid such as freon. At point 2, the freon has received a certain amount of energy. Expansion 2-3 in the depression generating means RC is substantially without energy loss. Then in part 3-4 the freon provides isobar heating of the air flow in the evaporator EV. Pressure losses have been simulated on the suction side for closing the cycle in the part from 4 to 1 of FIG. 1.

What is claimed is:

1. Heating device for vehicles with limited power, of the type comprising air conditioning by flowing atmospheric air over a coolant fluid circuit comprising a compressor whose delivery side is connected to a condenser then to a buffer reservoir, a thermostatic valve and an evaporator, further comprising a diverting means for diverting the delivery from the compressor to a depression generating device for heating the atmospheric air flow through the evaporator in order to heat this air, which causes expansion of the coolant fluid in the gaseous phase without loss of energy, before it enters the cabin, said diverting means and depression generating device being connected between the delivery side of the compressor and the evaporator.

2. The device as claimed in claim 1, wherein the bypass means is a valve with an input switchable to one or other of two outputs one assigned to air conditioning, the second to heating.

3. The device as claimed in claim 1, wherein the depression generating means provides isenthalpic expansion.

4. The device as claimed in claim 3, wherein said depression generating means is a capacity regulator which is controlled as a function of the pressure at the suction side of the compressor, and which is connected to the input of the evaporator by a mixer.

5. The device as claimed in claim 4, with the condenser comprising a fan, wherein diversion of the delivery from the compressor is provided by stopping the ventilator.

6. The device as claimed in claim 4, wherein said capacity regulator is associated in parallel with at least one additional nozzle.

7. The device as claimed in claim 4, wherein said capacity regulator comprises a nozzle with controllable passage section.

8. The device as claimed in claim 6 or 7, wherein placing of the additional nozzles in parallel or controlling the passage section is controlled as a function of the degree of heating desired.

9. The device as claimed in one of claims 1 to 7, further comprising a preheating device, such as an electric resistance, in the air flow entering the evaporator, which is in addition when the heating is resumed.

10. The device as claimed in one of claims 1 to 7, wherein means are provided for preheating the buffer reservoir and the evaporator for completing the thermodynamic effect obtained in accordance with the invention.

* * * * *